United States Patent

[11] 3,577,935

| [72] | Inventors | Richard D. Reinhart;<br>Robert O. Straughn, Minneapolis, Minn. |
|---|---|---|
| [21] | Appl. No. | 613,254 |
| [22] | Filed | Feb. 1, 1967 |
| [45] | Patented | May 11, 1971 |
| [73] | Assignee | General Mills, Inc. |

[54] EXTRUSION APPARATUS
12 Claims, 14 Drawing Figs.

[52] U.S. Cl. .................................................. 107/14, 18/14
[51] Int. Cl. ........................................... A21c 11/16
[50] Field of Search ........................................... 107/14; 18/14; 25/17

[56] References Cited
UNITED STATES PATENTS

| 3,349,156 | 10/1967 | Zieg ............................. | 18/14A |
| 1,500,749 | 7/1924 | Howard et al. ................ | 25/17 |
| 2,683,897 | 7/1954 | Patterson ..................... | 18/14 |
| 3,075,242 | 1/1963 | Grafried ...................... | 18/8 |

FOREIGN PATENTS

| 446,012 | 7/1950 | Italy ............................ | 107/14(.1) |

*Primary Examiner*—Laverne D. Geiger
*Assistant Examiner*—Robert I. Smith
*Attorneys*—Anthony A. Juettner, William C. Babcock and L. Me Roy Lillehaugen ABSTRACT: An apparatus and method for extruding an elongated, tubular, corrugated product having a plurality of longitudinally extending indentations or depressions on its surface. Extrudable material is forced through an extrusion apparatus having an annular extrusion orifice formed by a die opening in the extrusion apparatus, and a mandrel having its projecting end positioned in the opening. Either the shape of the die opening or the shape of the mandrel is formed in such a manner that the thickness of the space surrounding the mandrel varies at a number of different points. A product made by using this apparatus has a somewhat coblike appearance.

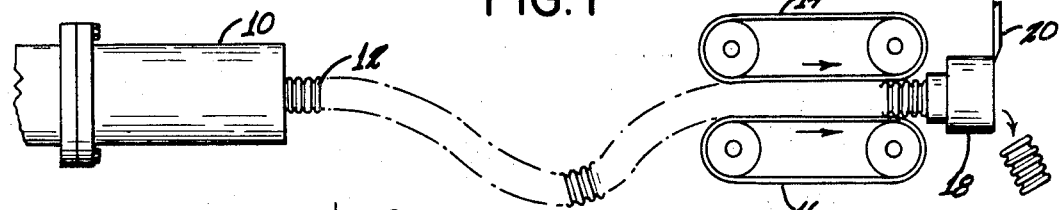
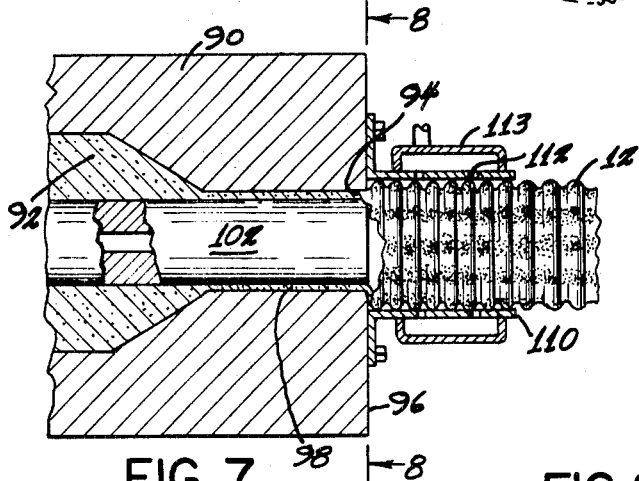
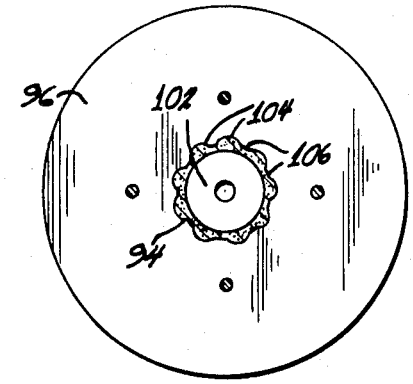
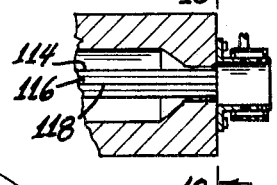
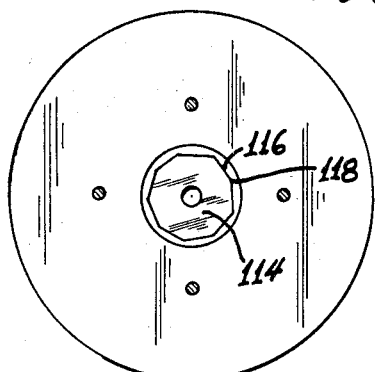
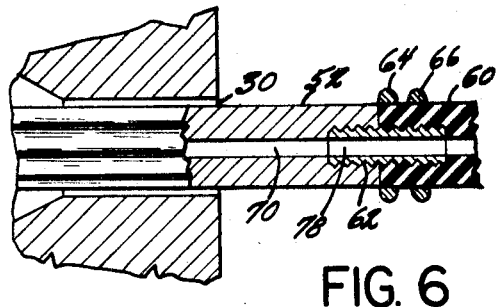
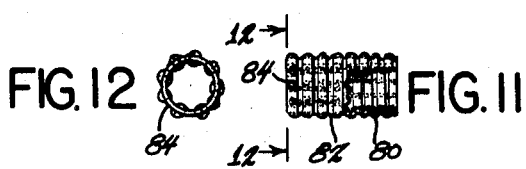
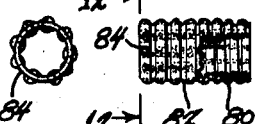
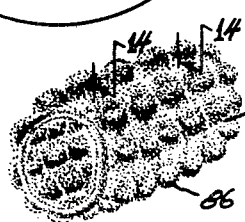

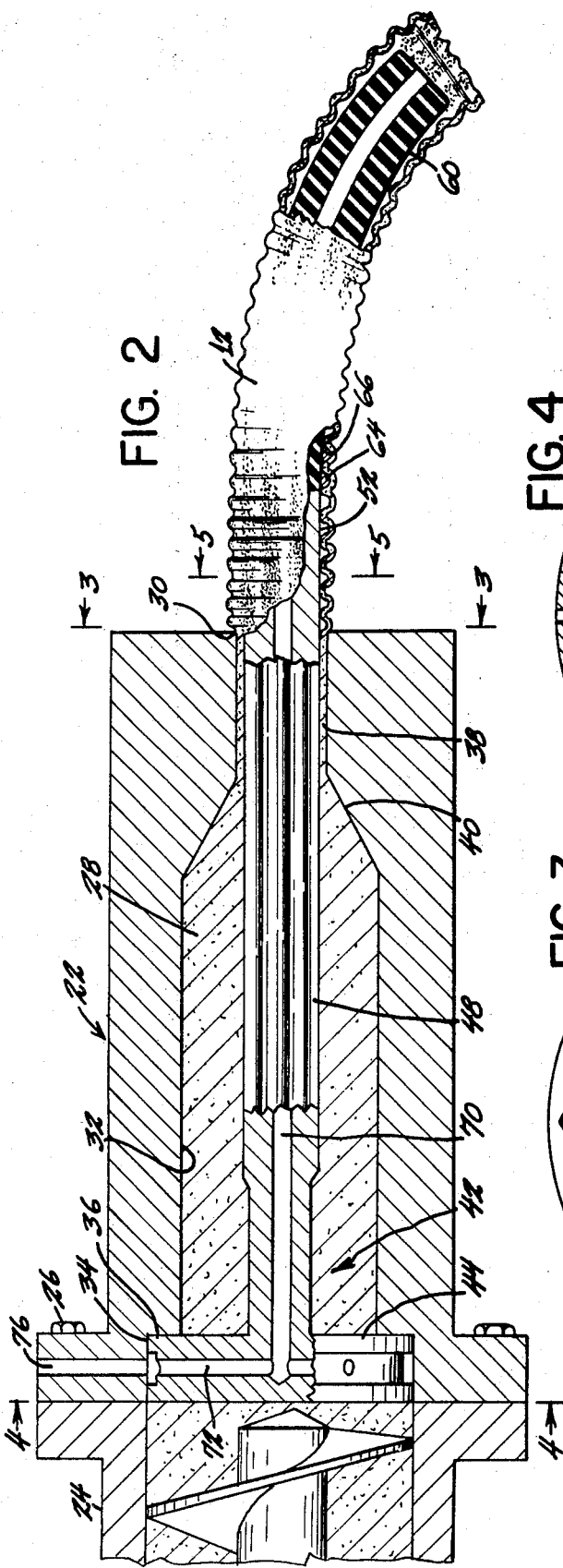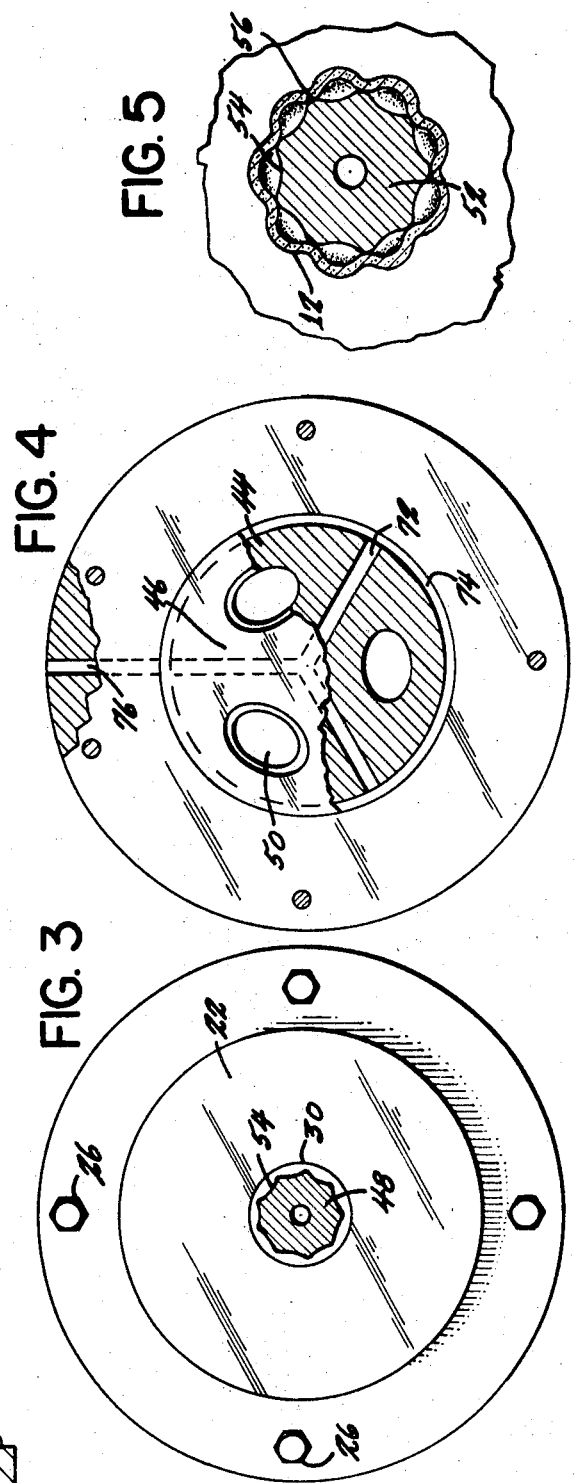

EXTRUSION APPARATUS

The present invention relates to an extrusion apparatus, and more particularly to an apparatus and method for continuously forming a tubular corrugated product or extrudate having a plurality of elongated longitudinally extending indentations or depressions equidistantly spaced about the periphery of the tubular extrudate.

It is well known in the art to produce cylindrically shaped tubular products or extrudate, such as macaroni, by forcing a dough material through an extrusion orifice in which one end of a die pin or mandrel is positioned. Tubular-shaped products have been formed having other cross-sectional configurations as well, such as oval shapes, square shapes, and the like. According to the known state of the art, such tubular extrudates have been formed with substantially smooth outer and inner surfaces. To the best of applicants' knowledge, it has not been feasible to produce a tubular extrudate having a substantially uniform wall thickness throughout, and an outer surface having a plurality of parallel, spaced-apart peripheral indentations or transverse corrugations, and a plurality of parallel, elongated longitudinally extending indentations or depressions, which impart to the extrudate a somewhat coblike appearance.

Accordingly, one subject of the present invention is to provide an improved apparatus for forming an extruded tubular product.

A further object is to provide an extrusion apparatus for forming a tubular corrugated extrudate having a plurality of elongated longitudinally extending indentations or depressions on its outer surface.

A still further object is to provide a process for forming a tubular corrugated extrudate having a plurality of elongated longitudinally extending indentations or depressions on its outer surface.

Other objects and advantages of the invention will become apparent from a consideration of the following specification and drawings. Before proceeding with a detailed description of the invention however, a brief description of it will be presented.

Briefly, the extrusion apparatus or die assembly includes a die housing having a die chamber or passage therein which terminates in a die opening in the wall or face of the die housing, through which material can be extruded. An elongate die insert or mandrel is positioned in the die chamber so that one of its ends projects into the die opening, thereby forming an extrusion orifice having a prescribed annular shape. Either the die opening or the surface of the end portion of the mandrel is formed with a plurality of elongate grooves which extend parallel to the direction of flow of material as it passes through the die chamber. As a result, the annular gap or peripheral space formed around the mandrel within the die opening has a cross-sectional shape which varies in thickness at a number of different points as it surrounds the mandrel.

The invention will best be understood by reference to the following drawings in which:

FIG. 1 is a partial schematic view illustrating an extrudate being formed by an extruder and subsequently being cut into segments of predetermined length;

FIG. 2 is an elevational view in section showing an extrusion apparatus or die assembly;

FIG. 3 is a sectional view taken along line 3–3 of FIG. 2;

FIG. 4 is a sectional view taken along line 4–4 of FIG. 2;

FIG. 5 is an enlarged partial sectional view taken along line 5–5 of FIG. 2;

FIG. 6 is an enlarged partial view depicting a portion of the apparatus;

FIG. 7 is a partial sectional view illustrating another embodiment of the invention;

FIG. 8 is a sectional view taken along line 8–8 of FIG. 7;

FIG. 9 illustrates another embodiment of the invention;

FIG. 10 is an enlarged sectional view taken along line 10–10 of FIG. 9;

FIG. 11 is a sectional view showing a sliced segment of the tubular extrudate;

FIG. 12 is a sectional view taken along line 12–12 of FIG. 11;

FIG. 13 is a perspective view illustrating the extrudate in FIGS. 11 and 12, after it has been subjected to a puffing operation; and FIG. 14 is a partial sectional view taken along line 14–14 of FIG. 13.

FIG. 1 illustrates an extrusion apparatus designated generally by reference numeral 10 for forming an extruded product or extrudate 12. A pair of counterrotating belt assemblies 14 and 16 are provided for gripping the material 12 at a point remote from the extruder 10, and advancing and guiding it into an end piece 18, at which point it is cut into segments of predetermined length by a slicing mechanism 20.

FIG. 2 illustrates the extrusion apparatus or die assembly 10 in greater detail. The apparatus includes a die housing 22 which is attached to the barrel of an extruder 24 by means of bolts 26. The die housing 22 is provided with a die chamber or passage 28 which terminates with a die opening 30 in the face of the die assembly. The chamber 28 is formed in four positions, a first cylindrical bore 32, a second cylindrical bore 34 which forms a shoulder 36 with the bore 32, a third cylindrical bore 38 which defines the die opening 30, and a frustoconical portion 40 which connects the bores 32 and 38 together and defines a transition passage.

A die insert or mandrel 42 is positioned within the chamber 28, and it includes a mounting ring member 44, spokes or arms 46, and an elongate stem 48 which is connected to the ring member 44 by means of the arms 46. As noted in FIG. 4, passages 50 are formed for permitting material to flow from the extruder 24 into the die housing 22. The mandrel 42 is press fit within the bore 34 in such a manner that end 52 of the stem 48 projects through the die opening 30. As noted, the stem 48 is smaller than the die opening 30, and as explained below, it has a somewhat different overall cross-sectional shape, so that an annular gap or peripheral space is formed around the mandrel end 52 which varies in thickness at a number of different points.

As illustrated in FIG. 3, the die opening 30 has a substantially circular cross-sectional shape. The stem 48 on the other hand, has a cross-sectional shape which approximates the shape of the opening 30, but differs somewhat in specific detail; thus, as shown in FIGS. 2 and 3, the stem 52 is substantially cylindrically shaped. The stem 48 is provided with a plurality of grooves 54 on its surface which are parallel to the longitudinal axis of the stem, i.e. parallel to the direction of flow of material through the die chamber 28, and they are equidistantly spaced about the periphery of the stem. As depicted in FIGS. 3 and 5, adjacent grooves 54 are separated by lands 56, which have a smaller peripheral width than the peripheral width of the grooves 54. Although their relative widths can vary, preferably, the grooves should be at least twice as wide as the lands. Thus, the peripheral space surrounding the stem 52 within the die opening 30 has an annular shape which varies in thickness from a minimum in the region of the lands to a maximum in the region of the grooves. It should be realized, of course, that if desired, the die opening 30 and the stem end 52 might have some other cross-sectional shape as well; provided however, that the general cross-sectional shape of the stem approximates that of the die opening. As noted in FIGS. 3 and 5, the stem has nine sets of grooves and lands; this of course can vary depending upon the shape of the desired extrudate. Moreover, if desired, an adjusting mechanism (not shown) might be provided for adjusting the position of the stem end 52 within the die opening 30 so that it is concentric with respect to the opening.

A flexible tube 60 is secured to the end 52 of the mandrel stem by means of a threaded member 62 (note FIG. 6). The tube 60 serves as a support for the extrudate 12 as it is discharged through the extrusion orifice, and its relative length can vary. The tube 60 is substantially the same size as, and it has substantially the same cross-sectional shape as, the stem end 52. One or more ring-shaped members 64 and 66 are mounted on the tube 60 proximate the end of the stem. The rings 64 and 66 are spaced apart relative to each other, and they are formed so that they fit quite snugly on the surface of the tube 60 so that they do not move axially. As shown, both rings are mounted on the tube in such a manner that they encircle the threaded member 62. If desired of course, the tube 60 might be formed in such a manner that the ring-shaped members form an integral part of the tube. The rings 64 and 66 form a back pressure producing device which restrains or restricts the free flow of the extrudate through the extrusion orifice.

The stem 48 is provided with an air passage 70 which extends parallel to the longitudinal axis of the mandrel. The passage 70 leads into each of three radially extending passages 72 formed in the spokes 46; the passages 72 in turn communicate with a groove 74 formed in the periphery of the mounting ring member 44. As illustrated in FIG. 2, a passage 76 is formed in the die housing 22, and it communicates with the groove 74 and the passages 70 and 72. Means, not shown in the drawings, are provided for supplying pressurized air into the passages. As noted in FIG. 6, the threaded member 62 is likewise provided with a passage 74 which is aligned with the passage 70.

In operation, it has been found that this invention is particularly useful in forming ready-to-eat food products which are formed having a tubular shape. Ingredients which form such products are mixed and cooked to form a gelatinized cereal dough which is then extruded to form a product having the desired shape and size. In general, doughs derived from wheat, corn, oats, rye, or the like, as well as mixtures of these cereal grains, can be used and cooked to the desired degree of gelatinization in any conventional manner. Additional steps such as cutting, puffing, drying, and the like, are thereafter performed to complete the process. Since this invention concerns the extrusion apparatus, the other equipment used in the processing operation will not be described in detail.

The overall processing conditions, such as the optimum temperature, pressure, and moisture conditions within the equipment, can vary depending upon the type of dough being processed, the desired characteristics of the final product, and the like. Generally, the extrudate when discharged, should be somewhat pliable so that it will stretch without breaking, and it should not be overly sticky or tacky. Since the specific processing conditions do not form a part of this invention, they will not be described in further detail.

As depicted in FIG. 2, the dough material is forced through the extrusion apparatus 10, and more particularly the extrusion chamber 28 and extrusion orifice by the extruder 24. It must be understood of course, that the extruder 24 merely illustrates one type of device which might be used for forcing the dough material through the apparatus. As pressure is exerted on the dough material, it is forced through the passages 50, through the bore 32, through the tapering passage 40, and into the annular passage formed within the bore 38 by the mandrel stem 52 and the cylindrical surface of the bore. As the dough material is discharged through the orifice, it emerges as a tubular extrudate having a substantially uniform wall thickness throughout.

Since the mandrel stem 52 is formed with a plurality of grooves 54 and lands 56, the thickness of the annular space about the stem 52 varies, and the flow of material through the extrusion orifice is uneven. In other words, the flow of material through the orifice in the regions of the grooves is somewhat faster than the flow of material in the regions of the lands 56. As a result, the dough material tends to fold on itself in the groove regions as it emerges out of the orifice, and form a plurality of corrugations or folds which are parallel to each other and separated by peripheral indentations or depressions. The lands 56 cause a plurality of parallel, continuous, elongated indentations or depressions to be formed which extend axially or longitudinally along the surface of the elongated extrudate. The number of longitudinal indentations depends on the number of lands on the stem 52.

While the thickness of the annular space in the groove and land regions might vary depending upon the desired wall thickness of the extrudate, it has been found that the following dimensions formed an extrudate having desirable characteristics. The radius of the orifice was about 0.165 inch; the outside dimension of the stem from its centerline to the surface of the lands was about 0.155 inch; and the inner dimension of the stem from its centerline to the deepest part of the grooves was about 0.145 inch. Thus, the annular space or gap of the orifice varied from about 0.010 to 0.020 inches from its narrowest to its widest dimension. This example of course, is merely illustrative and it is not intended to limit the scope of the invention.

The ring members 64 and 66 restrain or impede the free flow of material away from the extrusion orifice and they exert a back pressure on the extrudate; thus, they aid in causing the extrudate to fold onto itself in the groove regions of the stem and thus form transverse corrugations. As the individual corrugations bypass the members 64 and 66, they are supported by the flexible tube 60 for a short distance. As noted in FIG. 1, the extrudate loops downwardly before it is engaged by the belt assemblies 14 and 16. The path of the extrudate in this manner causes it to stretch out, and adjacent corrugations to separate somewhat from each other.

Pressurized air is discharged through the passage 70 into the extrudate 12. While not absolutely essential, the pressurized air serves several purposes. It aids in supporting the extrudate after the individual corrugations pass the end of the tube 60 so that the extrudate does not collapse; it aids in stretching the extrudate so that the corrugations separate from each other; it cools the extrudate; and it aids in controlling the drag caused by the rings 64 and 66. As to the latter, by increasing the flow of air through the passage 70, and consequently the tube 60, some of the air flows rearwardly between the extrudate, and the tube 60, the rings 64 and 66, and the stem end 52, thus reducing the friction between the extrudate, and these members. Conversely, by decreasing the flow of air, the amount of drag can be increased.

FIGS. 11 and 12 illustrate the extrudate 12 after it has been cut into segments of predetermined length. As shown, the tubular extrudate has a somewhat cylindrical shape, and the wall thickness is substantially the same throughout. A plurality of corrugations 80 are formed by parallel, spaced apart peripheral indentations or depressions 82. Moreover, a plurality of parallel, elongated, longitudinally extending indentations or depressions 84 are also formed; the indentations 84 being formed by the lands 56 on the mandrel stem 48. As depicted in FIG. 12, the extrudate has nine sides, which corresponds to the number of lands and grooves on the mandrel.

FIGS. 13 and 14 show the product 86 of FIGS. 11 and 12 after it has been subjected to a puffing operation, such as radiant heat, fat frying, vacuum puffing, or the like. As can be seen, the peripheral and longitudinal indentations 82 and 84 respectively, are substantially perpendicular to each other, and they cause the tubular extrudate to have a somewhat coblike appearance.

FIGS. 7 and 8 illustrate another embodiment of the invention. This embodiment is quite similar to that depicted in FIG. 2, in that the extrusion apparatus includes a die housing 90 having a die chamber or passage 92 therein and a die opening 94 formed in the face 96 of the die housing. The passage 92 includes a cylindrical bore 98 which forms the die opening. A die insert or mandrel 100 is positioned within the passage 92 in such a manner that the end 102 projects into the cylindrical bore 98. As illustrated in FIG. 7, the end of the mandrel does not extend beyond the face 96 of the die housing 90, but terminates flush with the face surface. If preferred of course, the end of the mandrel could extend beyond the face of the housing 90. As shown in FIG. 8, the mandrel stem has a cross-sectional shape which is substantially circular. The die opening 94 likewise has a configuration which is generally circular in cross-sectional shape, but it includes a plurality of equally spaced-apart grooves 104 which are formed in the surface of the cylindrical bore 98, which extend parallel to the longitudinal axis of the mandrel. Adjacent grooves are separated by land portions 106. Thus, an annular opening which varies in thickness from a minimum in the land regions to a maximum in the groove regions, is formed which surrounds the end 102 of the mandrel.

A tubular cowling 110 is secured to the face 96 of the housing 90 by appropriate means, in such a manner that it is aligned with the passage 92 formed in the housing. The cowling 110 has an internal diameter and shape which corresponds to the desired external diameter and shape of the corrugated extrudate as it emerges from the extrusion orifice. The cowling acts to restrict or impede the flow of the extrudate through the orifice, in much the same manner as the ring members 64 and 66 described above in conjunction with FIG. 2; thus it aids in forming the corrugations as the extrudate is discharged from the housing. A plurality of passages 112 are formed in the cowling for admitting pressurized air into the cowling. A manifold 113, which surrounds the cowling 110, distributes air to the various passages. The amount of friction between the extrudate and the cowling can be regulated by controlling the amount of air supplied. If desired, a tube, similar to the tube 60 illustrated in FIG. 2, might be secured to the end of the die pin for supporting the extrudate as it is advanced from the extruder toward the cutting mechanism.

The operation of this embodiment is substantially the same as that described above in conjunction with FIG. 2. In other words, as the dough material is forced through the die housing 90, it emerges as a tubular extrudate having a plurality of peripheral and longitudinal indentations caused by the lands and grooves in the surface of the bore 98, as well as the cowling 110.

FIGS. 9 and 10 illustrate another embodiment of the invention which is similar to those already described. The major difference between this embodiment and those already described is that the mandrel 114 is formed so that it has a polygonal cross-sectional shape. As depicted in FIG. 10 the mandrel 114 is formed so that it has a plurality of sides 116 which are joined together to form points 118. As noted, no grooves or lands are provided on either the mandrel or in the surface of the orifice. An extrudate formed by using such an apparatus differs slightly from that depicted in FIGS. 11 and 12 in that the axial or longitudinal indentations are omitted, or at best, the indentations are small. Thus, the resulting extrudate is formed having a plurality of peripheral indentations which result in a corrugated tubular extrudate.

In the above description and attached drawings, a disclosure of the principles of this invention is presented, together with some of the embodiments by which the invention may be carried out.

We claim:

1. An extrusion apparatus for forming a tubular corrugated extrudate comprising a die housing provided with a die chamber therein which terminates with a die opening having a prescribed shape, said die opening being formed by a cylindrical bore, an elongated mandrel within the die chamber, means for positioning said mandrel within said chamber so that one of its ends projects through said die opening, said mandrel end having a substantially cylindrical cross-sectional shape which is smaller than the cross-sectional shape of the die opening thereby defining a peripheral space surrounding said mandrel end which varies in thickness at a number of different points as it surrounds the mandrel, the surface of the mandrel end being provided with a plurality of equidistantly spaced-apart grooves which extend parallel to the longitudinal axis of the mandrel, adjacent grooves being separated by land portions, said land portions having a narrower peripheral width than the peripheral width of the grooves.

2. An extrusion apparatus for forming a tubular corrugated extrudate comprising a die housing provided with a die chamber therein which terminates with a die opening having a prescribed shape, an elongated mandrel within the die chamber, means for positioning said mandrel within said chamber so that one of its ends projects into said die opening, said mandrel end having a cross-sectional shape which differs from and is smaller than the cross-sectional shape of the die opening thereby defining a peripheral space surrounding said mandrel end which varies in thickness at a number of different points as it surrounds the mandrel, and a flexible tube of predetermined length which is secured to the projecting end of the mandrel, the cross-sectional shape and size of said tube being substantially the same as the size and shape of said mandrel end.

3. The combination of claim 2 wherein the mandrel is provided with a passage therein which extends parallel to the longitudinal axis of the mandrel, said passage providing a conduit for discharging a gaseous medium into the tubular extrudate.

4. An extrusion apparatus for forming a tubular corrugated extrudate comprising a die housing provided with a die chamber therein which terminates with a die opening having a prescribed shape, an elongated mandrel within the die chamber, means for positioning said mandrel within said chamber so that one of its ends projects into said die opening, said mandrel end having a cross-sectional shape which differs from and is smaller than the cross-sectional shape of the die opening thereby defining a peripheral space surrounding said mandrel end which varies in thickness at a number of different points as it surrounds the mandrel, and stationary means are provided externally of the die chamber for restraining the free flow of the extrudate through the extrusion orifice thereby providing lateral corrugations in the extrudate.

5. The combination of claim 4 wherein the mandrel end projects through the die opening and terminates exteriorly of the die chamber.

6. The combination of claim 4 wherein the die opening is formed by a cylindrical bore and the mandrel end is substantially cylindrically shaped, the surface of at least one of the cylindrically shaped members being provided with a plurality of grooves which extend parallel to the longitudinal axis of the mandrel.

7. The combination of claim 6 wherein said grooves are equidistantly spaced about the periphery of the mandrel, and adjacent grooves are separated by land portions, said land portions having a narrower peripheral width than the peripheral width of the grooves.

8. The combination of claim 6 wherein the grooves and lands are formed on the surface of the cylindrical bore.

9. The combination of claim 4 wherein the die opening has a circular cross-sectional shape, and the mandrel end has a polygonal cross-sectional shape.

10. The combination of claim 4 wherein the mandrel end projects through the die opening, and said means includes at least one ring-shaped member positioned on the mandrel proximate its projecting end.

11. The combination of claim 4 wherein said restraining means includes a tubular cowling, means for attaching said cowling to the die housing so that it is aligned with the die chamber and the die opening, the internal cross-sectional size of said cowling being larger than cross-sectional size of the die opening.

12. The combination of claim 11 wherein at least one passage is formed in the cowling for admitting pressurized air into said cowling.